(12) United States Patent
Yegorin (10) Patent No.: US 11,573,818 B2
(45) Date of Patent: Feb. 7, 2023

(54) CONTAINERIZED COMPUTING ENVIRONMENTS

(71) Applicant: International Business Machines Corporation, Armonk, NY (US)

(72) Inventor: Anton Yegorin, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 17/102,470

(22) Filed: Nov. 24, 2020

(65) Prior Publication Data

US 2022/0164209 A1 May 26, 2022

(51) Int. Cl.
*G06F 9/455* (2018.01)
*G06F 8/61* (2018.01)

(52) U.S. Cl.
CPC ............ *G06F 9/45558* (2013.01); *G06F 8/63* (2013.01); *G06F 9/45545* (2013.01); *G06F 2009/45562* (2013.01); *G06F 2009/45595* (2013.01)

(58) Field of Classification Search
CPC .... G06F 9/45558; G06F 8/63; G06F 9/45545; G06F 2009/45562
See application file for complete search history.

(56) References Cited

U.S. PATENT DOCUMENTS

| | | | |
|---|---|---|---|
| 9,965,261 B2 | 5/2018 | Chen | |
| 10,469,574 B1 | 11/2019 | Dai | |
| 10,528,337 B1 | 1/2020 | Varadharajan Kannan | |
| 2009/0100443 A1* | 4/2009 | Bohle | G06F 9/451 719/320 |
| 2012/0324069 A1* | 12/2012 | Nori | G06F 9/5066 709/222 |
| 2017/0068676 A1 | 3/2017 | Jayachandran | |
| 2018/0088926 A1 | 3/2018 | Abrams | |
| 2019/0243628 A1* | 8/2019 | Goldmann | G06F 8/63 |
| 2021/0034537 A1* | 2/2021 | Shuster | G06F 3/067 |
| 2021/0263779 A1* | 8/2021 | Haghighat | G06F 9/5061 |

OTHER PUBLICATIONS

"Best practices for writing Dockerfiles | Docker Documentation", printed on Oct. 12, 2020, 15 pages, <https://docs.docker.com/develop/develop-images/dockerfile_best-practices/>.
Mell et al., "The NIST Definition of Cloud Computing", National Institute of Standards and Technology, U.S. Department of Commerce, Special Publication 800-145, Sep. 2011, 7 pages.

* cited by examiner

*Primary Examiner* — Dong U Kim
(74) *Attorney, Agent, or Firm* — Stephen R. Yoder (57) ABSTRACT

Building images that enable improved utilization of previously built image layers. An image build system evaluates commands prior to their use and differentiate between stateful and stateless commands. Employing such an approach enables stateless commands to be identified (e.g. labeled), thus enabling the image build system to handle the stateless commands differently from stateful commands. This enables the re-use of cached/stored image layers, thus reducing image size by avoiding the creation of new image layers.

19 Claims, 8 Drawing Sheets

FIG. 1

| | |
|---|---|
| docker build -t test-from-cache:1 -f Dockerfile --build-arg UNIQUE_ARG=1 . <br> sending build context to Docker daemon  26.1MB <br> Step 1/4 : FROM busybox <br> ---> 54511612f1c4 <br> Step 2/4 : ARG UNIQUE_ARG=1 <br> ---> Running in f38f6e76bbca <br> ---> fada1443b67b <br> // line 3 original layer <br> Step 3/4 : RUN echo Hello ${UNIQUE_ARG} <br> ---> Running in ee960473d88c <br> Hello 1 <br> Removing intermediate container ee960473d88c <br> ---> c29d98e09dd8 <br> Step 4/4 : COPY ./files <br> ---> edfa35e97e86 <br> Successfully built edfa35e97e86 <br> Successfully tagged test-from-cache:1 <br> $ docker inspect test-from-cache:1 -f '{{json .RootFS.Layers}}' \| jq <br> [ <br> "sha256:6a749002dd6a65988a6696ca4d0c4cbe87145df74e3bf6feae4025ab28f420f2", <br> "sha256:01bf0fcfc3f73c8a3cfbe9b7ef6c2bf8c6d21b6115d4a71344fa497c3808978" <br> ] | docker build -t test-from-cache:2 -f Dockerfile --build-arg UNIQUE_ARG=2 --cache-from test-from-cache:1 . <br> Sending build context to Docker daemon  26.1MB <br> Step 1/4 : FROM busybox <br> ---> 54511612f1c4 <br> Step 2/4 : ARG UNIQUE_ARG=2 <br> ---> Using cache <br> ---> fada1443b67b <br> // line 3 - no cache re-use <br> Step 3/4 : RUN echo Hello ${UNIQUE_ARG} <br> ---> Running in 22698cd872d3 <br> Hello 2 <br> Removing intermediate container 22698cd872d3 <br> ---> dc5f801fc272 <br> Step 4/4 : COPY ./files <br> ---> addabd73e43e <br> Successfully built addabd73e43e <br> Successfully tagged test-from-cache:2 <br> $ docker inspect test-from-cache:2 -f '{{json .RootFS.Layers}}' \| jq <br> [ <br> "sha256:6a749002dd6a65988a6696ca4d0c4cbe87145df74e3bf6feae4025ab28f420f2", <br> "sha256:c70c7fd4529ed9ee1b4a691897c2a2ae34b1929063072d3f403ba632c33cba702" <br> ] |

FIG. 2

| | |
|---|---|
| docker build -t test-from-cache:1 -f Dockerfile --build-arg UNIQUE_ARG=1 .<br>Sending build context to Docker daemon  26.1MB<br>Step 1/4 : FROM busybox<br>---> 54511612f1c4<br>Step 2/4 : ARG UNIQUE_ARG=1<br>---> Running in f38f6e76bbca<br>---> fada1443b67b<br>// line 3 original layer + hint<br>Step 3/4 : RUN echo Hello ${UNIQUE_ARG}<br>---> Running in ee960473d88c<br>---> ee960473d88c<br>Hello 1<br>Removing intermediate container ee960473d88c<br>---> c29d98e09dd8<br>Step 4/4 : COPY . /files<br>---> edfa35e97e86<br>Successfully built edfa35e97e86<br>Successfully tagged test-from-cache:1<br><br>$ docker inspect test-from-cache:1 -f '{{json .RootFS.Layers}}' \| jq<br>[<br>"sha256:6a749002dd6a65988a6696ca4d0c4cbe87145df74e3bf6feae4025ab28f420f2",<br>"sha256:01bf0fcfc3f73c8a3cfbe9b7ef6c2bf8c6d21b6115d4a71344fa497c3808978"<br>] | docker build -t test-from-cache:2 -f Dockerfile --build-arg UNIQUE_ARG=2 --cache-from test-from-cache:1 .<br>Sending build context to Docker daemon  26.1MB<br>Step 1/4 : FROM busybox<br>---> 54511612f1c4<br>Step 2/4 : ARG UNIQUE_ARG=2<br>---> Using cache<br>---> fada1443b67b<br>// line 3 (hint + command) - cache re-use<br>Step 3/4 : RUN echo Hello ${UNIQUE_ARG}<br>---> Using cache<br>---> ee960473d88c<br>Hello 2<br>Removing intermediate container 22698cd872d3<br>---> dc5f801fc272<br>Step 4/4 : COPY . /files<br>---> addabd73e43e<br>Successfully built addabd73e43e<br>Successfully tagged test-from-cache:2<br><br>$ docker inspect test-from-cache:2 -f '{{json .RootFS.Layers}}' \| jq<br>[<br>"sha256:6a749002dd6a65988a6696ca4d0c4cbe87145df74e3bf6feae4025ab28f420f2",<br>"sha256:b60f7fd4529ed9ee1b4a691897c2a2ae34b192963072d3f403ba632c33cba903"<br>] |

CONTAINERIZED COMPUTING ENVIRONMENTS

BACKGROUND

The field relates generally to computing environments, and more particularly to methods for containerized computing environments. The present invention further relates to a computer program product comprising computer-readable program code that enables a processor of a processing system to implement such a method. The present invention further relates to systems for building an image for a containerized computing environment.

Operating-system-level virtualization has become widely used in cloud computing and platform as a service (PaaS) frameworks. Operating-system-level virtualization is a server-virtualization method where the operating system kernel allows multiple isolated user space instances called containers. On the LINUX operating system, with support from kernel namespaces and the c-groups mechanism, emerging container solutions such as Docker and LXC have been attracting more and more attention and are currently in rapid development. (Note: the term(s) "LINUX," "DOCKER," and/or "LXC" may be subject to trademark rights in various jurisdictions throughout the world and are used here only in reference to the products or services properly denominated by the marks to the extent that such trademark rights may exist.)

Compared with a traditional virtual machine, a container uses a smaller image size, launches faster, and costs less resources (e.g., memory, processing clock cycles), thus making the container a lightweight and fast virtualization solution.

A container is a running instance of an image. Such images are typically structured as a chain of layers. Each new modification is represented as a new layer, added on top of its parent (base) layer. The creation of new image layers for new modifications (e.g. caused by commands) can lead to large image sizes.

SUMMARY

In one aspect of the present invention, a method, a computer program product, and a system for building an image for a containerized computing environment includes: (i) analyzing a command comprising one or more instructions for building an image to determine if the command is either a stateless command or a stateful command; and (ii) based on the result of analyzing, associating an identifier with the command, the identifier being configured to indicate if the command is stateful or stateless.

According to an aspect of the present invention there is provided a computer-implemented method of processing a command for building an image for a containerized computing environment. The method comprises analyzing a command comprising one or more instructions for building an image to determine if the command is either a stateless command or a stateful command. Based on the result of analyzing, an identifier is associated with the command, the identifier being configured to indicate if the command is stateful or stateless.

According to another aspect of the present invention, there is provided a computer-implemented method for building an image for a containerized computing environment. The method comprises obtaining a set of commands comprising one or more instructions for building an image, a command of the set of commands having an associated identifier indicating that the command is stateful or stateless. For the command, re-use of a previously built image layer is controlled based on the associated identifier indicating that the command is stateful or stateless.

According to another embodiment of the present invention, there is provided a computer program product for processing a command for building an image for a containerized computing environment, the computer program product comprising a computer readable storage medium having program instructions embodied therewith, the program instructions executable by a processing unit to cause the processing unit to perform a method according to one or more proposed embodiments when executed on at least one processor of a data processing system.

According to another embodiment of the present invention, there is provided a computer program product for building an image for a containerized computing environment, the computer program product comprising a computer readable storage medium having program instructions embodied therewith, the program instructions executable by a processing unit to cause the processing unit to perform a method according to one or more proposed embodiments when executed on at least one processor of a data processing system.

According to yet another aspect of the present invention, there is provided a processing system comprising at least one processor and the computer program product according to one or more embodiments, wherein the at least one processor is adapted to execute the computer program code of said computer program product.

According to further aspect of the present invention, there is provided a system for processing a command for building an image for a containerized computing environment. The system comprises an analysis component configured to analyze a command comprising one or more instructions for building an image to determine if the command is either a stateless command or a stateful command. The system also comprises an editor component configured, based on the result of analyzing, to associate an identifier with the command, the identifier being configured to indicate if the command is stateful or stateless.

According to yet another aspect of the present invention, there is provided an image build system for building an image for a containerized computing environment. The image build system comprises an interface component configured to obtain a set of commands comprising one or more instructions for building an image, a command of the set of commands having an associated identifier indicating that the command is stateful or stateless. The image build system also comprises a controller configured to, for the command, control re-use of a previously built image layer based on the associated identifier indicating that the command is stateful or stateless.

BRIEF DESCRIPTION OF THE SEVERAL VIEWS OF THE DRAWINGS

Embodiments of the present invention will now be described, by way of example only, with reference to the following drawings, in which:

FIG. 2 is a table illustrating the build process implemented in accordance with an exemplary conventional Docker file;

FIG. 3 is a table illustrating the build process implemented in accordance with an exemplary (modified) Docker file according to a proposed embodiment;

DETAILED DESCRIPTION

Building images that enable improved utilization of previously built image layers. An image build system evaluates commands prior to their use and differentiate between stateful and stateless commands. Employing such an approach enables stateless commands to be identified (e.g. labelled), thus enabling the image build system to handle the stateless commands differently from stateful commands. This enables the re-use of cached/stored image layers, thus reducing image size by avoiding the creation of new image layers.

The present invention seeks to provide concepts for building images that enable improved utilization of previously built image layers (e.g. available via an image cache memory), thus potentially avoiding the creation of new image layers which would otherwise increase image size for example.

Embodiments may be employed in combination with conventional/existing image build systems, such as a Docker build system. In this way, embodiments may integrate into legacy systems so as to improve and/or extend their functionality and capabilities. An improved (e.g. reduced size and/or more efficient) containerized computing environment may therefore be provided by proposed embodiments. The system may be adapted to pre-process container image build commands so as to provide augmented/enhanced commands that enable improved image cache utilization across a population of images.

A proposed system may be incorporated into an existing/conventional image build system. Thus, there may be proposed an image build system which evaluates commands prior to their use and differentiates between stateful and stateless commands. Employing such an approach may enable stateless commands to be identified (e.g. labeled), thus enabling the image build system to handle the stateless commands differently from stateful commands. This may, for example, enable the re-use of cached/stored image layers, thus reducing image size by avoiding the creation of new image layers.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above in the Background section, containers have become the virtualization choice over traditional virtual machines for hosting application programs (applications) in cloud computing environments. However, the existing container file system implementation still faces various challenges, including management of container image size.

To address the above and other challenges, illustrative embodiments of the invention provide concepts for improving a process of building images (for containers). Such concepts may enable improved utilization of previously-built image layers (e.g. available via an image cache memory), thus potentially avoiding the creation of new image layers and, in turn, avoiding an increase in image size. In particular, a proposed concept is to enhance image build commands with identifiers (e.g. labels, indicators, comments, etc.) to enable improve utilization of previous image layers (e.g. from stored population of images). For instance, an identifier may be associated with a stateless command, thus enabling an image build engine to clearly differentiate between stateful and stateless commands.

Unlike a conventional image build system (which does not have any identifiers for commands), proposed embodiments supplement commands with identifiers (e.g. 'hints') which may allow more granular control of the stateful or stateless commands.

"Stateful command" refers to a command that is dependent (i.e. makes use of) a former or current execution state. Stateful commands are thus dependent on the system state. In this way, stateful commands keep track of former (previous) execution states. Conversely, "stateless command" refers to a command that is independent of a former of current execution state. Stateless commands are thus self-contained, i.e. everything contained within the command, and handled in two distinct phases, a "command" and "response". Stateless command therefore do not keep track of former (previous) execution states.

Reference to an "image" should be taken to refer to a file-like entity which may be thought as being like a static file of which a container is a running instance. An image is typically structured as a chain of layers. Since a container is a running instance of a container, an image may otherwise referred as a 'container image', thus indicating that the image facilitates the creation of a container.

Before describing concepts according to illustrative embodiments, an overview of a container system with which illustrative embodiments can be implemented will be given.

In order to achieve portability and reusability, a container makes use of a union mount mechanism to construct and combine different layers for file sharing, instead of using an entire disk image file as a traditional virtual machine does. Specifically, after container initialization, the container union mounts base layers (read-only) and a top layer (read-write) together to build a root file system. During the container's lifecycle, all modifications to the root file system are written on the top layer in an incremental way. The commit operation causes the container to save the current top layer and to start to write on a new layer over the saved top layer, thus creating a new top layer.

Figure 1:
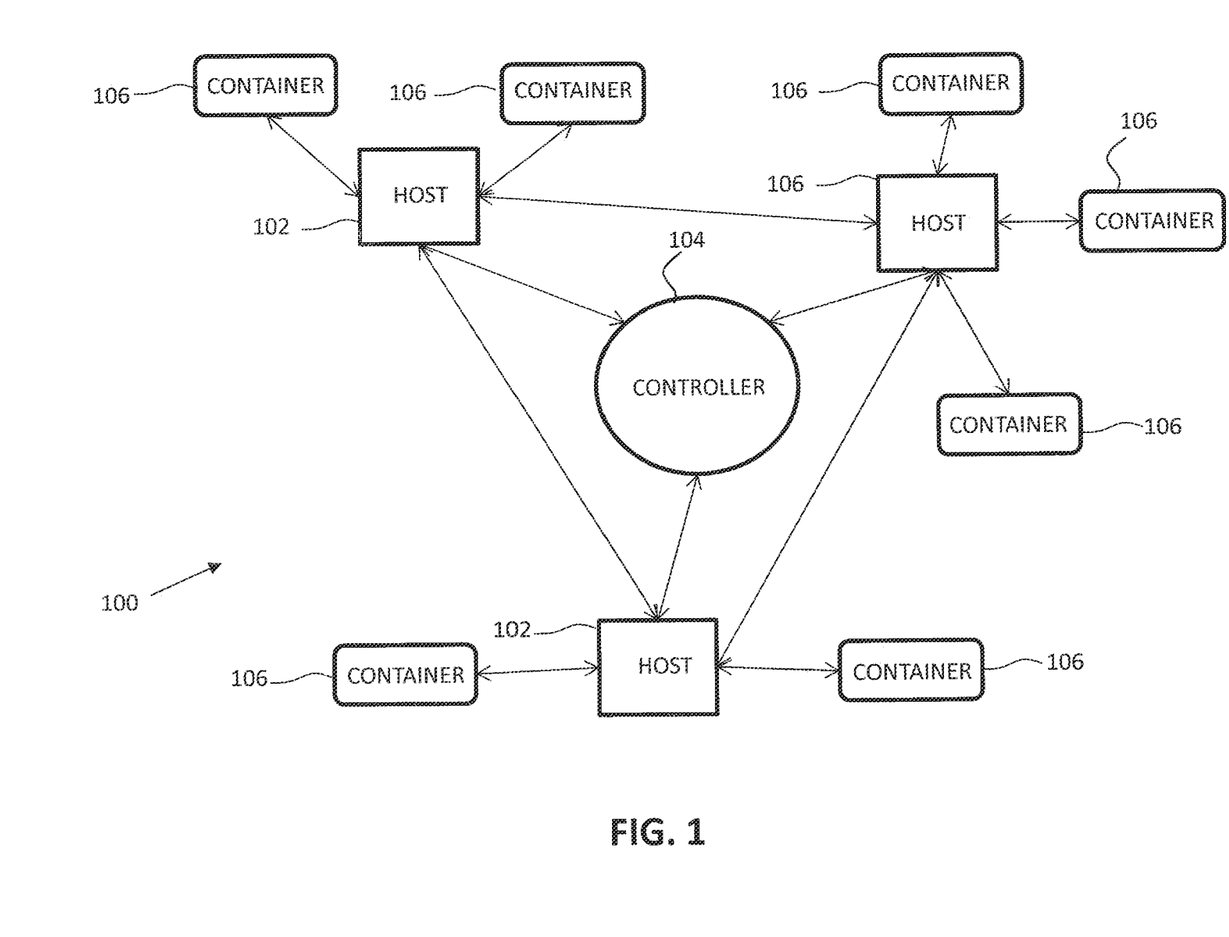
FIG. 1 illustrates a container hosting environment in accordance with which one or more embodiments of the invention are implemented.

As shown in FIG. 1, a container cluster 100 (e.g., Docker Swarm, Magnum and Kubernetes) comprises hosts 102 and a cluster controller 104. In a cloud computing platform, a cluster of host devices (hosts) that use containers to host applications, such as shown in FIG. 1, is called a "container hosting environment." Hosts 102 create and run containers 106, and connect to each other via a high-speed network (represented by the interconnecting arrows in FIG. 1). As mentioned, in illustrative embodiments, a host 102 creates one or more containers 106 to respectively execute one or more containerized stateful applications (i.e., an application that executes in a container and keeps track of former (previous) container execution states). Cluster controller 104 is responsible for managing container hosts 102. For example, cluster controller 104 monitors container status and launches high availability (HA) processes, and executes user commands such as commands that cause container migration between hosts and that start backup and recovery operations.

A running (executing) container is launched from its container image. Before a container is launched, the host needs to obtain the corresponding container image from a container registry. In a Docker container implementation, an image is structured as a chain of layers. Each new modification is represented as a new layer, added on top of its parent (base) layer.

Illustrative embodiments of the present invention that may provide for improved cache utilization will now be described.

Some embodiments of the present invention are directed to an image build engine configured to differentiate between stateful and stateless commands, thus providing for improved container layer cache re-usability. In particular, it is proposed to indicate if a command is stateful or stateless by associating an identifier (e.g. hint, symbol or special character) with the command. For example, the identifier may be placed before or in-line with a command.

Some embodiments of the present invention are directed to the concept of processing a command for building an image (or 'container image') for a containerized computing environment. This may allow the command to be identified as either a stateful command or a stateless command. In this way, an image build engine may clearly differentiate between stateless and stateful commands and improve container layer cache re-usability. In particular, it is proposed to employ identifiers will allow an image build system to determine if a command is stateless or stateful. Based on such determination, the build system may decide on re-use of a previously built image layer.

Some embodiments of the present invention enhance image build commands with labels, hints or identifiers that enable better image cache utilization across a population of images. Such labels or identifiers may also be used for debugging purposes.

Some embodiments of the present invention are directed to the concept of pre-processing image build commands that enable stateless commands to be clearly differentiated from stateful commands. By way of example, some embodiments of the present invention may be thought of as providing hint attributes to accompany commands. Such hints may be provided adjacent, preceding, within or alongside the commands.

An exemplary embodiment may provide a method of processing a command for building an image for a containerized computing environment. In such an exemplary method, a command comprising one or more instructions for building an image is analyzed to determine if the command is either a stateless command or a stateful command. Based on the result of analyzing, an identifier is associated with the command, wherein the identifier is configured to indicate if the command is stateful or stateless.

For example, associating an identifier with the command may comprise appending a command prefix or command attribute to the command to indicate that the command is stateless. The command prefix or command attribute may, for instance, comprise symbol or comment string. In this way, a simple, human-readable and/or computer-readable identifier may be used to identify (e.g. label, highlight or otherwise mark) a stateless command, so that an image build engine can potentially handle the stateless command in a manner which may lead to improved efficiency and/or reduced image size for example. Also, use of a simple symbol or string may help to reduce complexity and/or cost of implementation.

Analyzing a command may comprise: determining whether the command exists in a previous image layer; responsive to determining that the command exists in a previous layer, determining if the instance of the command in the previous layer can be re-used; and responsive to determining the instance of the command in the previous layer can be re-used, determining that the command is stateful. In this way, embodiments may run simple checks to determine if a command is stateless, thus help to alleviate processing or resource requirements of proposed embodiments.

Some embodiments of the present invention may provide a method for building an image for a containerized computing environment. In such an exemplary method, a set of commands comprising one or more instructions for building an image is obtained, wherein a command of the set of commands has an associated identifier indicating that the command is stateful or stateless. For the command having an associated identifier, re-use of a previously built image layer is controlled based on the associated identifier indicating that the command is stateful or stateless.

In some embodiments of the present invention, controlling re-use of a previously built image layer may comprise: responsive to the identifier associated with the command indicating that the command is stateful, re-using a previously built image layer; and responsive to the identifier associated with the command indicating that the command is stateless, preventing use a previously built image layer. Embodiments may therefore enable an image build system to decide whether to re-use a cached layer or command. This may improve container layer cache re-usability, which may lead to smaller image size, better cache utilization and/or improved performance.

In some embodiments of the present invention, controlling re-use of a previously built image layer may comprise: responsive to the identifier associated with the command indicating that the command is stateless, ignoring the command. Embodiments may therefore provide an image build system with flexibility in handling a stateless command.

Some embodiments of the present invention allow for an image build engine to clearly differentiate between stateful and stateless commands and thus improve container layers cache re-usability. Some embodiments of the present invention are particularly beneficial for address the continued need for efficient cache utilization in an image build system.

By way of further description of some embodiments of the present invention, an image build system will now be considered. The image build system follows a set of commands (i.e. instructions) defined in a configuration file. When the image build system encounters a next command, it runs checks to determine if the command exists in any of the previous image layers and, in case, when layer cannot be re-used it additionally can check for an associated stateless command identifier (wherein the identifier indicates that the command can be ignored and does not affect layer structure).

The stateless command identifier can be provided as part of a comment or can be any kind of additional command attribute. For example, an identifier of a stateless command may comprise a comment such as: "#+ hint stateless . . . #" preceding the command definition.

According to another example, an identifier of a stateless command may comprise a "*" (asterisk) character that is added as a prefix to (i.e. provided immediately preceding) a command definition, thus resulting in a command definition in the form: "*<COMMAND> <ARGUMENTS>".

According to yet another example, an identifier of a stateless command may comprise a "!" (exclamation mark) character that is added as a prefix to (i.e. provided immediately preceding) a command definition, thus resulting in a command definition in the form: "!<COMMAND> <ARGUMENTS>".

It will, however, be appreciated that there are many other possible ways of associating an identifier with a command.

Subsequently, during an image build process, the image build system may decide to either consider or ignore a stateless command identifier associated with a command.

A container layer may be labeled that it has certain attributes (stateless, stateful, etc.). Container layers built this way can be re-used in the build of other images that are derived from those layers or based on the same configuration.

Further, a command can be expanded to a multiple sub-command (for example, '/bin/sh-c' interpreter commands) where each sub-command may have an associated identifier. In such a case, the deeper a sub-command is in the chain the higher priority it has over a top-level command.

An identified stateless command (i.e. a stateless command having an associated identifier indicating that the command is stateless) may end up producing an "ephemeral layer".

By way of further demonstration of some embodiments of the present invention, an example of a conventional Docker build system will be described (with reference to FIG. 2) and, subsequently an example of such a system modified in accordance with a proposed embodiment will be described (with reference to FIG. 3).

An example of a conventional Docker build system, and more particularly, an exemplary set of commands of a conventional Docker file may be as follows:
   FFROM busybox
   ARG UNIQUE_ARG=world
   RUN echo Hello ${UNIQUE_ARG}
   COPY ./files Referring to FIG. 2, there is shown a table illustrating the build process implemented in accordance with the above conventional Docker file for first and second arguments in the command line "RUN echo Hello ${UNIQUE_ARG}". For the second argument, the cache from the build process for the first argument is available.

FIG. 2 shows flowchart 250 depicting a first method according to embodiments of the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

As can be seen from the second row (second box) of the second (right-hand) column of FIG. 2, there is no cache re-use by the conventional build process.

Conversely, an example of a Docker build system according to proposed embodiment will now be considered. More particularly, an exemplary set of commands of a (modified) Docker file according to a proposed embodiment may be as follows:
   FROM busybox
   ARG UNIQUE_ARG=world
   #+ hint stateless
   RUN echo Hello ${UNIQUE_ARG}
   COPY ./files In the above (modified) Docker file according to a proposed embodiment, the third line's command ("RUN echo Hello ${UNIQUE_ARG}") is preceded by a 'hint' that it is stateless. That is, an identifier is associated with the third command, wherein the identifier is provided as a comment (or 'hint') in the line immediately preceding the line containing the third command. The comment indicates that the next line (command) is stateless.

Referring to FIG. 3, there is shown a table illustrating the build process implemented in accordance with the above (modified) Docker file for first and second arguments in the command line "RUN echo Hello ${UNIQUE_ARG}". For the second argument, the cache from the build process for the first argument is available.

As can be seen from the second row (second box) of the second (right-hand) column of FIG. 3, the Docker build system determines from the identifier that the third command. Responsive to this determination, the Docker build system makes use of the original layer from the cache.

Thus, from the description above, it will be appreciated that an image build system with labeled instructions according to proposed embodiments can implement improved container image cache utilization. This may be achieved by identifying commands that do not affect final container image content and then avoiding the creation of new container image layers for such commands (which would otherwise increase the container image size). Some embodiments of the present invention may be thought of as differentiating between stateful and stateless commands to improve cache re-usability, and such differentiation between stateful and stateless commands may be achieved by associating identifiers with commands to indicate if they are stateless.

Figure 4:
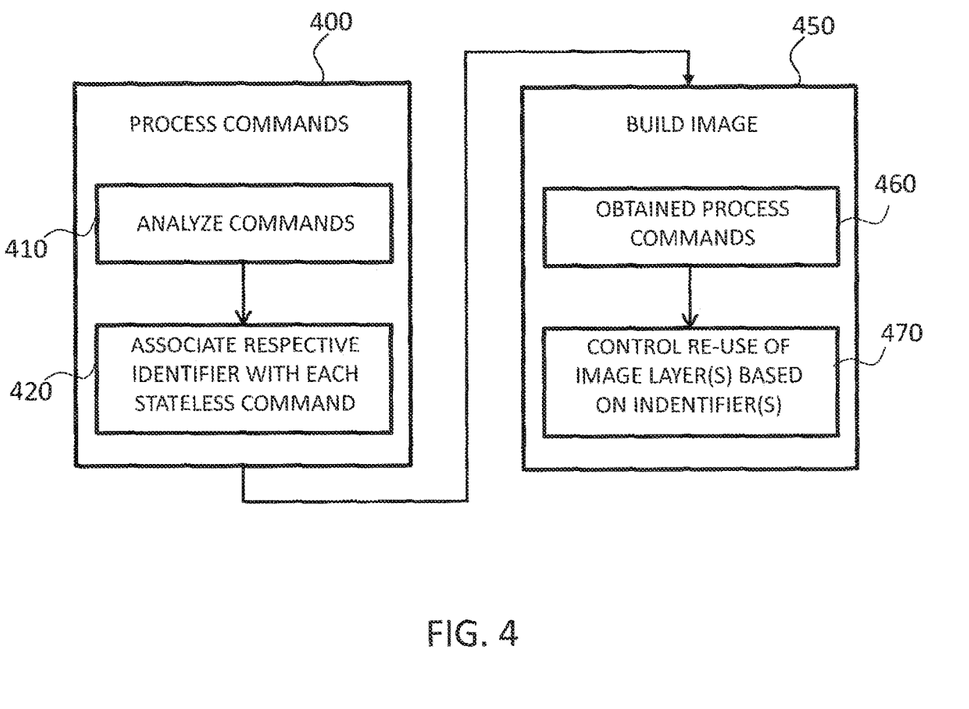
FIG. 4 depicts a flow diagram of a method according to a proposed embodiment.

Referring now to FIG. 4, there is depicted a flow diagram of a method according to an embodiment of the present invention. The method comprises two (sub-)methods: the first (sub-) method 400 comprises a method of processing commands for building an image according to an embodiment of the present invention; and the second (sub-)method 450 comprises a method for building the container image (using the processed commands). That is, the method depicted in FIG. 4 implements a method of (pre-)processing commands to identify stateless commands, followed by a proposed method for building an image from the (pre-)processed commands.

The first (sub-)method 400 is under taken to process a set of commands for building an image for a containerized computing environment. Each command comprises one or more instructions for building the container image In step 410, each command is analyzed to determine if it is either a stateless command or a stateful command. By way of example, the process of analyzing a command comprises: determining whether the command exists in a previous image layer; responsive to determining that the command exists in a previous layer, determining if the instance of the command in the previous layer can be re-used; and responsive to determining the instance of the command in the previous layer can be re-used, determining that the command is stateful.

In step 420, based on the analysis results from step 410, a respective identifier is associated with each command that has been determined as being stateless. In this example, an identifier comprises a character/symbol (such as a "*" of "!"), and an identifier is associated with a stateless command by inserting the character/symbol immediately preceding the command (on the same code/command line). In this way, a stateless command is identified by a respective identifier prefix which indicates that the command immediately following the identifier prefix is a stateless command.

It will be understood that, as a result of completing the first (sub-)method 400 to process the set of commands, a new set of (pre-)processed commands is provided by first (sub-)method. The new set of (pre-)processed commands comprises one or more stateless commands each having an associated identifier indicating the stateless nature of the command.

The new set of (pre-)processed commands is provided to the second (sub-) method 450 for building the container image using the (pre-)processed commands (from the first sub-)method 400).

In step 460, the set of (pre-)processed commands is obtained, for example via an communication interface. As explained above, one or more commands of the set has an associated identifier which indicates that the associated command is stateless.

In step 470, for each command, re-use of a previously built image layers (via cache memory) is controlled based on whether the command has an associated identifier indicating that the command is stateless. In particular, responsive to an identifier being associated with the command indicating that the command is stateless, use of a previously built image layer to respond to the command is prevented.

Figure 5:
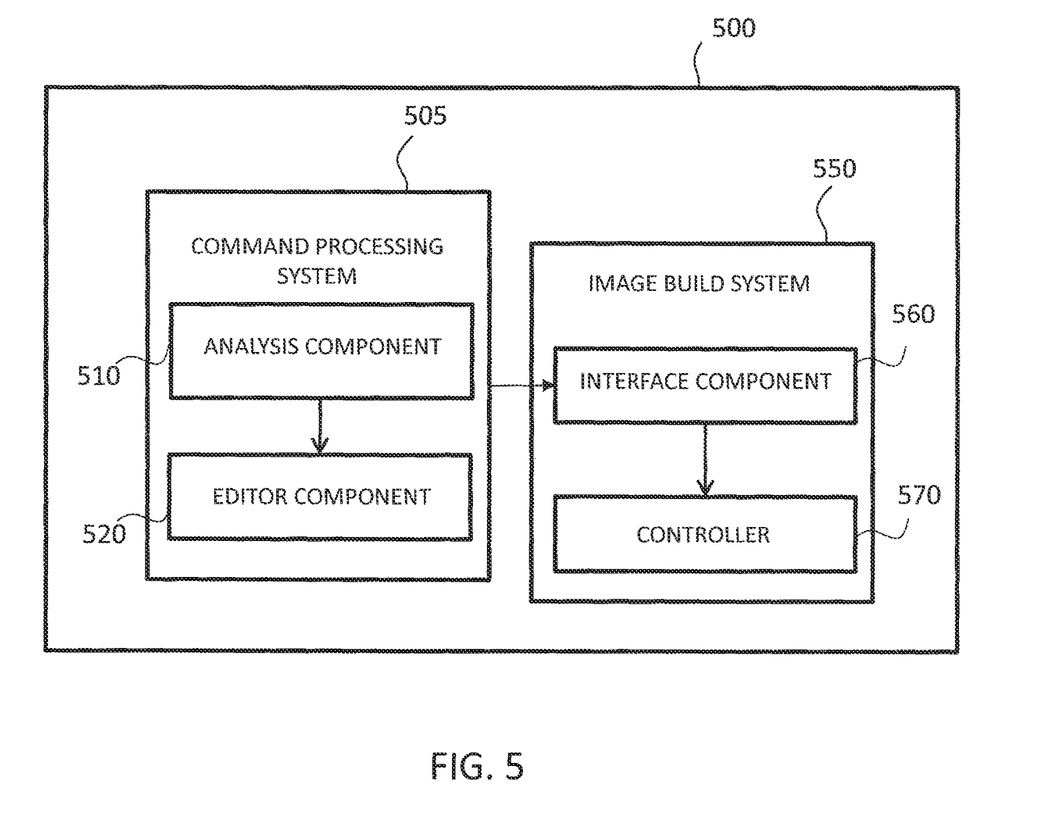
FIG. 5 depicts a simplified block diagram of a system according to a proposed embodiment.

Referring now to FIG. 5, there is depicted a simplified block diagram of a system 500 according to a proposed embodiment. The method comprises two (sub-)systems: the first (sub-) system 505 comprises a system for processing commands for building an image according to a proposed embodiment; and the second (sub-)system 550 comprises an image build system for building the container image (using the processed commands) according to embodiments of the present invention. That is, the system 500 depicted in FIG. 5 incorporates a proposed system 500 for (pre-)processing commands to identify stateless commands, combined with a proposed image build system 550 for building an image from the (pre-)processed commands.

The first (sub-)system 505 is configured to process a set of commands for building an image for a containerized computing environment. Each command comprises one or more instructions for building the container image. The first (sub-)system 505 comprises an analysis component 510 and an editor component 520.

The analysis component 510 analyzes each command to determine if it is either a stateless command or a stateful command. By way of example, the process of analyzing a command comprises: determining whether the command exists in a previous image layer; responsive to determining that the command exists in a previous layer, determining if the instance of the command in the previous layer can be re-used; and responsive to determining the instance of the command in the previous layer can be re-used, determining that the command is stateful.

Based on the analysis results the analysis component 510, the editor component associates a respective identifier with each command that has been determined as being stateless. In this example, an identifier comprises a comment/hint string, and an identifier is associated with a stateless command by inserting the comment/hint string in the line immediately preceding the command (at the code/command line directly above the command). In this way, a stateless command is identified by a respective identifier comment/hint which indicates that the command immediately following the comment/hint is a stateless command.

It will be understood that, as a result of processing the set of commands, the first (sub-) system 505 provides a new set of (pre-)processed commands. The set of (pre-) processed commands comprises one or more stateless commands each having an associated identifier indicating the stateless nature of the command.

The new set of (pre-)processed commands is provided to the second (sub-) system 550 for building the container image using the (pre-)processed commands (from the first sub-)system 505). The second (sub-)system 550 comprises an interface component 560 and a controller 570.

The interface component 560 obtains the set of (pre-)processed commands, for example via a wired or wireless communication link. As explained above, one or more commands of the set has an associated identifier which indicates that the associated command is stateless.

The controller, for each command, controls re-use of a previously built image layers (via cache memory) based on whether the command has an associated identifier indicating that the command is stateless. In particular, responsive to an identifier being associated with the command indicating that the command is stateless, the controller prevents use of a previously built image layer to respond to the command.

Thus, from the above description, it will be appreciated that proposed methods and systems provide for differentiation between stateless and stateful commands. Based on such differentiation, an image build system/method may handle stateless commands differently from stateful commands, thereby improving utilization of cache memory.

Some embodiments of the present invention are directed to a computer-implemented method for building an image for a containerized computing environment that includes the following steps: (i) obtaining a set of commands comprising one or more instructions for building an image, wherein a command of the set of commands has an associated identifier indicating that the command is stateful or stateless; and (ii) for the command, controlling re-use of a previously built image layer based on the associated identifier indicating that the command is stateful or stateless by (a) responsive to the identifier associated with the command indicating that the command is stateful, re-using a previously built image layer; or (b) responsive to the identifier associated with the command indicating that the command is stateless, preventing use a previously built image layer.

Some embodiments of the present invention ignore commends that are identified as stateless.

Embodiments described above have only included a limited set of examples of identifiers for indicating if a command is stateful or stateless. However, it will be appreciated that the proposed concept(s) may be adapted or modified to employ other ways of identifying stateless (commands).

As will be apparent from the above description, all or part of a system according to a proposed embodiment provided by a cloud-computing system. Also, a system for processing commands for building an image may be provided or implemented in a hybrid cloud-computing system.

With reference to the following description made with regard to a cloud computing system, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. The following description of a cloud computing system and environment is made purely for the purposes of explanation and understanding.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This off-premise cloud model may include at least five characteristics, at least three service models, and at least four deployment models.

Characteristics are as follows: On-demand self-service: a cloud consumer can unilaterally provide computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

Figure 6:
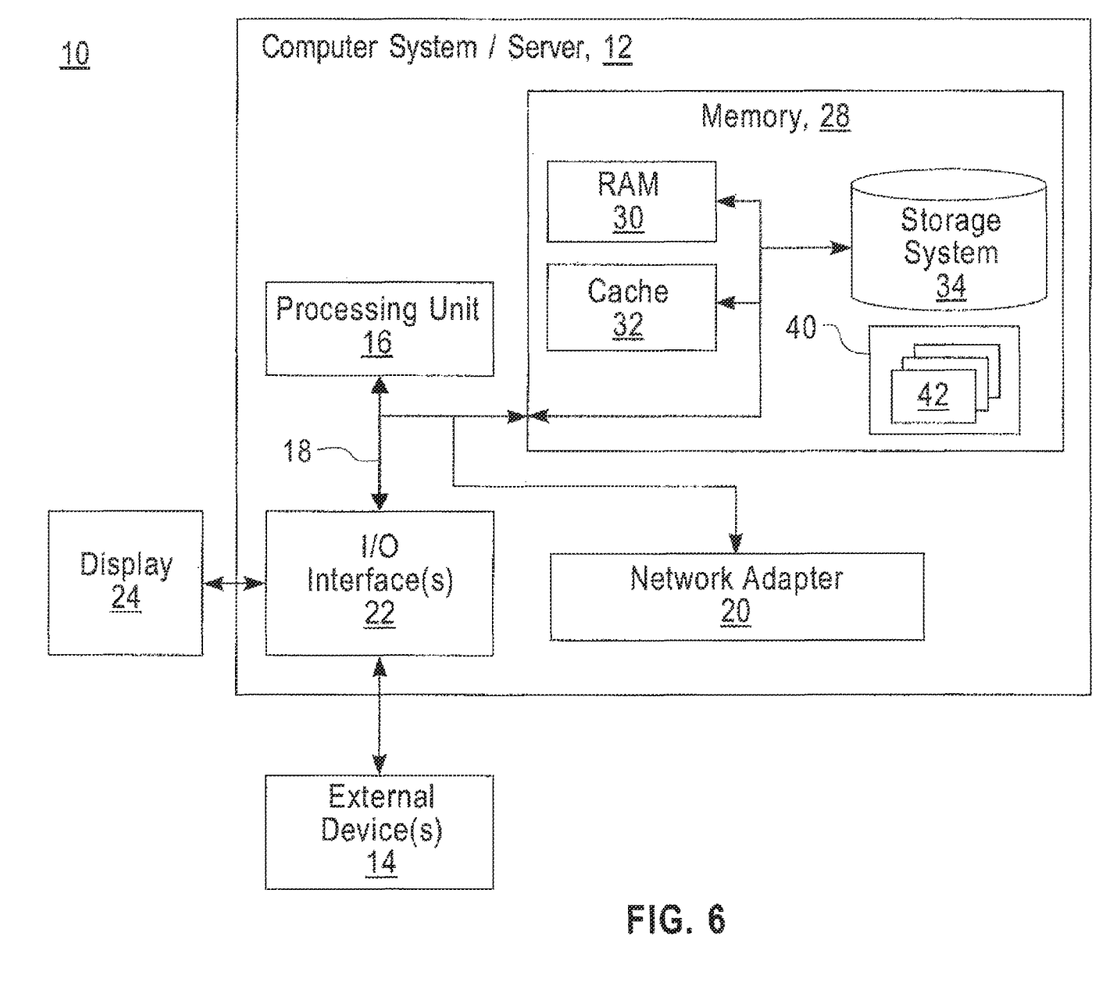
FIG. 6 illustrates a cloud system node.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
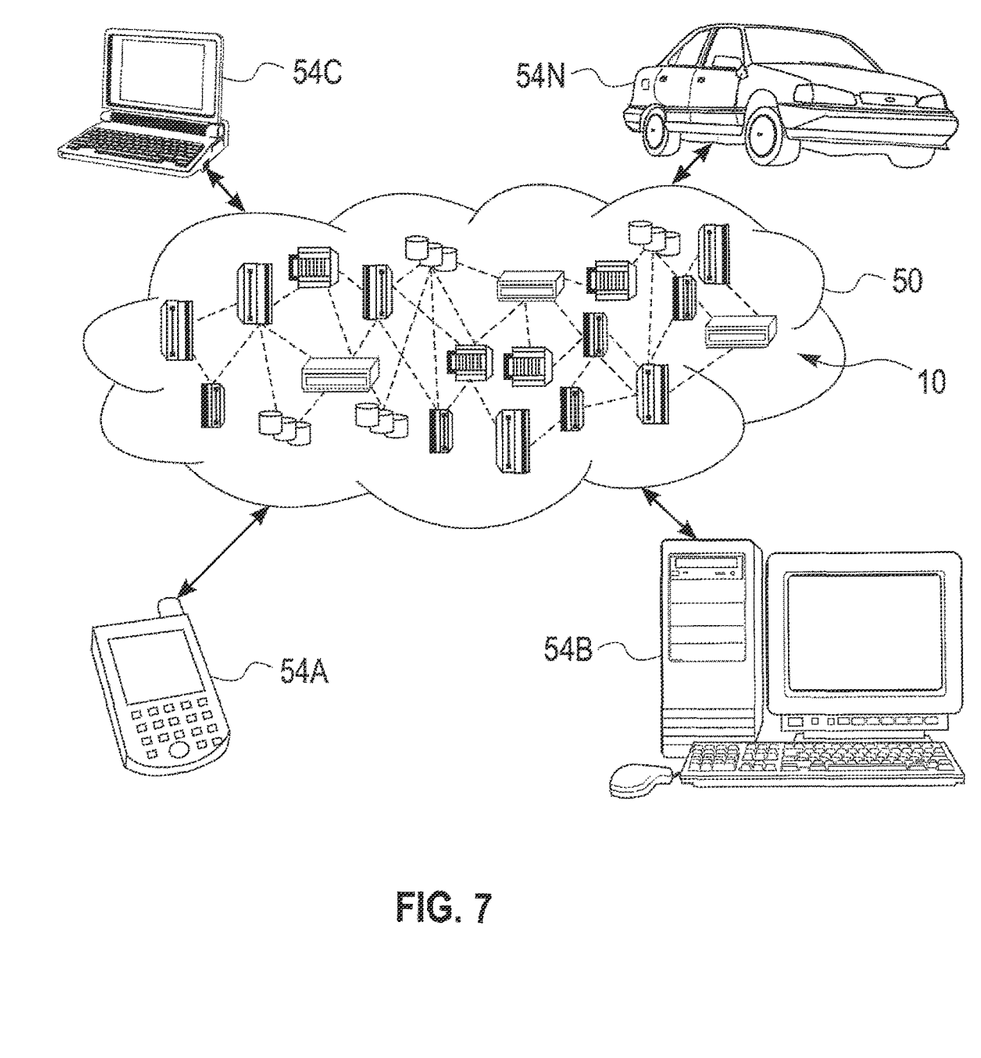
FIG. 7 illustrates a cloud computing environment according to an embodiment.

Referring now to FIG. 7, illustrative cloud computing environment or cloud computing system 50 is depicted. This can, in embodiments, be equated to the cloud computing system as depicted in FIG. 1 for example. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
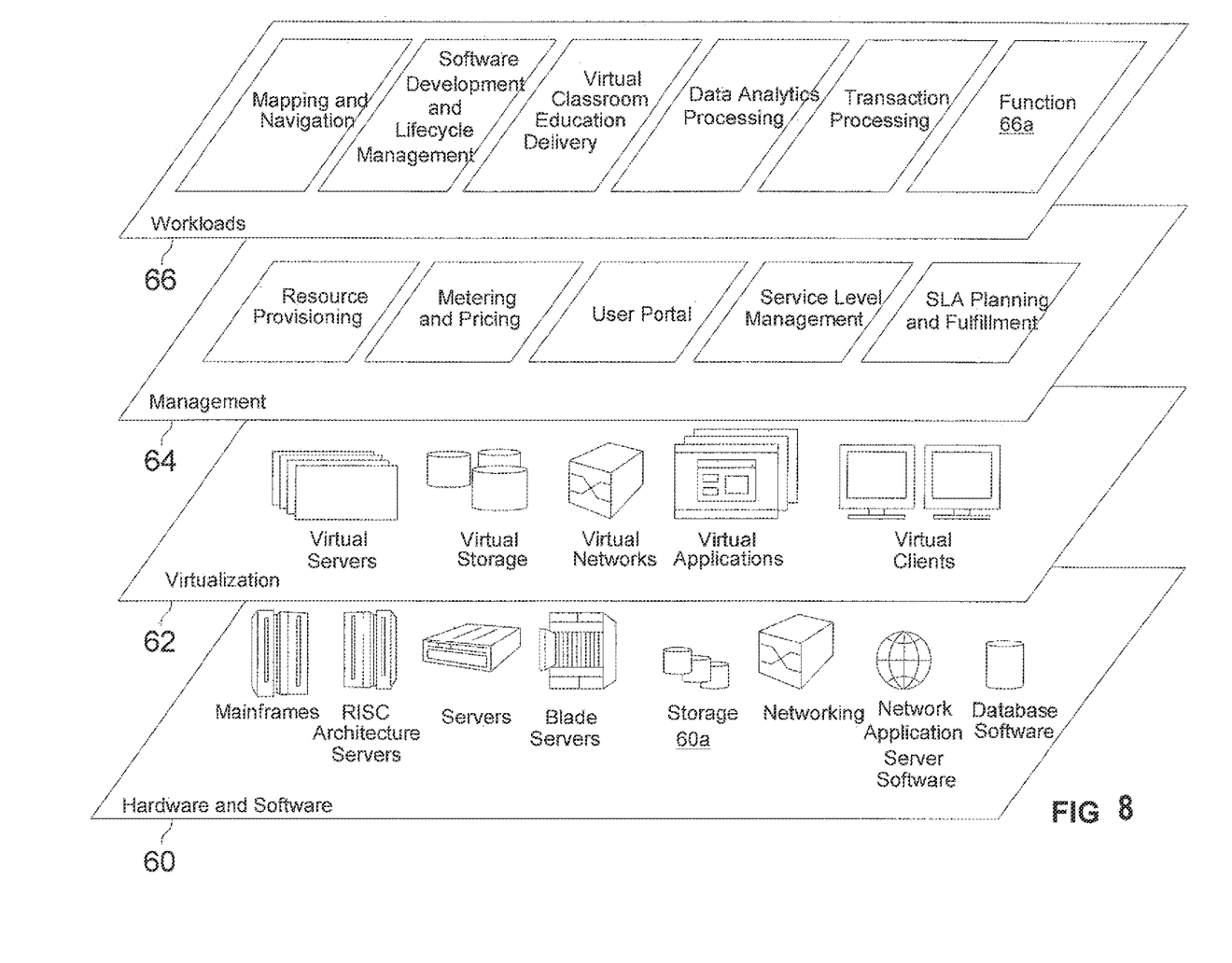
FIG. 8 illustrates cloud abstraction mode layers according to an embodiment.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Image building provides for container image building according to proposed concepts as detailed above.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of processing a command for building an image for a containerized computing environment, the method comprising:
    analyzing a command for building an image to determine if the command is either a stateless command or a stateful command; and
    based on the result of analyzing, modifying the command to indicate if the command is stateful or stateless.

2. The method of claim 1, wherein modifying the command comprises appending a command attribute to the command to indicate that the command is stateless.

3. The method of claim 2, wherein the command attribute is a prefix comprising a symbol.

4. The method of claim 1, wherein analyzing a command includes:
    determining the command exists in a first image layer as a first command instance, the first image layer being one image layer of a set of cached image layers;
    determining if the first command instance in the first image layer can be re-used; and
    responsive to determining the first command instance in the first image layer can be re-used, determining that the command is stateless.

5. The method of claim 4, wherein determining whether the command exists in the previous image layer includes:
    searching for the command in image layer data stored in a cache memory.

6. The method of claim 1, wherein the command is a container image build command of an image build system.

7. The method of claim 1, wherein modifying the command comprises adding a comment string in a comment field of the command.

8. A computer program product for processing a command for building an image for a containerized computing environment, the computer program product comprising a computer readable storage medium having program instructions embodied therewith, the program instructions executable by a processing unit to cause the processing unit to perform a method comprising:
    analyzing a command for building an image to determine if the command is either a stateless command or a stateful command; and
    based on the result of analyzing, modifying the command to indicate if the command is stateful or stateless.

9. The computer program product of claim 8, wherein modifying the command comprises appending a command attribute to the command to indicate that the command is stateless.

10. The computer program product of claim 9, wherein the command attribute is a prefix comprising a symbol.

11. The computer program product of claim 8, wherein analyzing a command includes:
    determining the command exists in a first image layer as a first command instance, the first image layer being one image layer of a set of cached image layers;
    determining if the first command instance in the first image layer can be re-used; and
    responsive to determining the first command instance in the first image layer can be re-used, determining that the command is stateless.

12. The computer program product of claim 11, wherein determining whether the command exists in the previous image layer includes:
    searching for the command in image layer data stored in a cache memory.

13. The computer program product of claim 8, wherein the command is a container image build command of an image build system.

14. A computer system for processing a command for building an image for a containerized computing environment, the computer system comprising:
    a processor set; and
    a computer readable storage medium having program instructions stored therein;
    wherein:
    the program instructions, when executed by the processor set, cause the processor set to perform operations including:
        analyzing a command for building an image to determine if the command is either a stateless command or a stateful command; and
        based on the result of analyzing, modifying the command to indicate if the command is stateful or stateless.

15. The computer system of claim 14, wherein modifying the command comprises appending a command attribute to the command to indicate that the command is stateless.

16. The computer system of claim 15, wherein the command attribute is a prefix comprising a symbol.

17. The computer system of claim 14, wherein analyzing a command includes:
    determining the command exists in a first image layer as a first command instance, the first image layer being one image layer of a set of cached image layers;
    determining if the first command instance in the first image layer can be re-used; and
    responsive to determining the first command instance in the first image layer can be re-used, determining that the command is stateless.

18. The computer system of claim 17, wherein determining whether the command exists in the previous image layer includes:
    searching for the command in image layer data stored in a cache memory.

19. The computer system of claim 14, wherein the command is a container image build command of an image build system.

* * * * *